United States Patent [19]

Rodriquez et al.

[11] Patent Number: 5,300,949
[45] Date of Patent: Apr. 5, 1994

[54] SCALABLE DIGITAL VIDEO DECOMPRESSOR

[75] Inventors: Arturo A. Rodriquez, Belmont, Calif.; Mark A. Pietras, Boynton Beach, Fla.; Steven M. Hancock, Boca Raton, Fla.; Robert F. Kantner, Jr., Boca Raton, Fla.; Charles T. Rutherfoord, Delray Beach, Fla.; Leslie R. Wilson, Boca Raton, Fla.

[73] Assignee: International Business Machines Corporation, Armonk, N.Y.

[21] Appl. No.: 965,129

[22] Filed: Oct. 22, 1992

[51] Int. Cl.5 ............................................... G09G 1/06
[52] U.S. Cl. ........................................ 345/202; 382/56
[58] Field of Search ............... 340/731, 799, 798, 723; 382/56, 41; 358/133, 426, 261.1, 261.2, 261.3, 427; 345/202, 112, 127, 185

[56] References Cited

U.S. PATENT DOCUMENTS

| | | | |
|---|---|---|---|
| 4,124,871 | 11/1978 | Morrin, II | 340/731 |
| 5,046,119 | 9/1991 | Hoffert et al. | 382/56 |
| 5,081,450 | 1/1992 | Luca et al. | 340/731 |
| 5,119,442 | 6/1992 | Brown | 382/56 |

Primary Examiner—Ulysses Weldon
Assistant Examiner—Doon Chow
Attorney, Agent, or Firm—Paul W. O'Malley; Andrew J. Dillon

[57] ABSTRACT

Decompression of video segments from a sequence of differential frames is done by selected scaling of frame resolution and color depth. A frame header indicates the computational complexity of decompression of a frame, allowing selection of scales for output resolution and color depth. Decompression proceeds by retrieving a frame from the compressed video stream in elementary units. An elementary unit is characterized by types, including an unchanged type, a homogeneous type, a pattern type and a predetermined pattern type. For a retrieved elementary unit of the unchanged type, an output pointer to a display buffer is moved by an elementary unit scaled by the output resolution scale. For a retrieved elementary unit of the homogeneous type, a color retrieved from the compressed video stream is applied to an area in the display buffer corresponding to an elementary unit scaled by the output resolution scale. For a retrieved elementary unit of the predetermined pattern type, a pattern from a table of patterns is retrieved using an index from the compressed video segment as an address. Two colors for the pattern are also retrieved and applied to the pattern.

32 Claims, 13 Drawing Sheets

SCALABLE DIGITAL VIDEO DECOMPRESSOR

BACKGROUND OF THE INVENTION

1. Technical Field

The invention relates to the decompression for playback of video segments on a data processing system. More particularly, the invention relates to a system and a method of decompressing video data while enabling scaling of frame resolution and color depth for playback of a video segment by the playback platform.

2. Description of the Related Art

A video signal comprises a sequence of frames, which when displayed at a given minimum frame rate (e.g., 15 to 30 frames per second in a personal computer), simulate the appearance of motion to a human observer. In a personal computer system, each frame of the video image comprises a matrix of picture elements or "pixels." A common image matrix has 320 columns by 240 rows of pixels. A pixel is the minimum unit of the picture which may be assigned a luminance intensity, and in color video, a color. Depending upon the data format used, as many as three bytes of data can be used to define visual information for a pixel. A pixel by pixel color description of all pixels for an entire frame can require over two hundred thousand bytes of data. Spatial resolution of an image is increased by increases in the number of pixels.

To display a video segment, if such full frames were replaced at a frame rate of 30 frames per second, a computer could be required to recover from storage and write to video memory as many as 27 million bytes of data each second. Few contemporary mass data storage devices have both the bandwidth required to pass such quantities of data or the storage capacity to hold more than a few minutes worth of digital video information directly stored. As used here, bandwidth means the volume of data per unit time which can be recovered from an auxiliary storage device. Data compression is used to accommodate auxiliary storage devices in the storage and recovery of video segments for playback in real time and to reduce traffic on the system bus.

Data compression allows an image or video segment to be transmitted and stored in substantially fewer bytes of data than required for full frame reproduction. Data compression can be based on eliminating redundant information from frame to frame in a digitized video segment (temporal compression), or by eliminating redundant information from pixel to pixel in individual frames (spatial compression). In addition, compression may exploit superior human perception of luminance intensity detail over color detail by averaging color over a block of pixels while preserving luminance detail.

Frame differencing compression methods exploit the temporal redundancy that exists between digital video frames from the same scene recorded moments apart in time. This reduces the required data needed to encode each frame. Two successive frames from a sequence of digital motion video frames are compared region by region. The comparison process determines whether two corresponding regions are the same or different. The size and location of each region, and the nature of the comparison are outside the scope of this invention.

Before temporal redundancy can exist, one frame necessarily represents a point in time after another frame. If the field of view of the frames is unchanged, then the regions from a frame at period N do not need to be encoded and stored if the regions in a frame at period N−1 are already known. When change has occurred, the changed regions of the later frame must be encoded and stored. When each region of two frames have been compared, and changed regions of the later period encoded and stored, the process moves to the next pair of frames. During playback, the decompression process adds the stored information for each period to the current state of the display memory using a process that is the logical reverse of the encoding process. This is called conditional replenishment.

When there is very little temporal redundancy in a digital motion video the method fails. However, in a motion video sequence of a flower growing, shot at 30 frames per second, frames contain a great deal of temporal redundancy and compress well using frame differencing. Similarly a sequence recorded through a moving camera will contain little redundancy and not compress well, assuming motion compensation algorithms are not employed.

While compression makes it possible to store and reproduce video segments on personal computers, the quantities of data involved and the computational load imposed on the system central processor still tax the capacity of many contemporary personal computers, particularly low end machines based on the Intel 8086/88 family of microprocessors. Large capacity machines designed for multitasking of applications and having advanced video adaptors have an easier time handling video segments, unless two or more video segments are required to be simultaneously reproduced.

A way of providing portability of decompressed data between machines of different capacity is to introduce resolution and color depth scalability. Resolution scalability allows the playback platform to change the number of pixels in an output image. A common display resolution is a matrix of 320×240 pixels. Other resolutions include 640×480 pixels and 160×120 pixels. Color depth scaling is used to reduce (or increase) the number of shades of color displayed. Use of such scaling would be enhanced were portable processes available to recognize and decode compressed video segments set up to support such scaling by the playback platform itself.

Three methods have been employed to support resolution and color depth scaling. All three techniques are targeted for use in transmission channel applications, where compressed video information can be transmitted and reconstructed progressively.

One technique involves use of image hierarchies. Each frame of a video segment is compressed at a plurality of spatial resolutions. Each level represents a different level of compression obtained by subsampling of 2 by 2 pixel regions of the next higher level of resolution. The resolution of the base level is the same as the raw data frame. Frame resolution scaling is obtained by selecting a particular level of resolution at the decompression platform. Time differential compression between frames is still done, but by selecting low resolution levels, low powered computers can decompress the stream.

A second technique known in the art is called bit-plane scalability. Here each frame in the video segment is compressed by encoding the bit-planes of the color information independently. Each bit-plane has the same spatial resolution as the original image frame. Each compressed video frame is organized from the most-significant bit (MSB) planes to the least-significant bit (LSB) planes. Color scalability is obtained by only decompressing and displaying the compressed higher order bit-planes of each frame.

A third technique known in the art is called subband coding. In subband coding, an image is decomposed into different frequency bands, downsampling the spatial resolution of each produced band, and compressing each frequency subband with a suitable compression technique independently (e.g. vector quantization). Scalability is obtained by only decompressing, upsampling and displaying the compresssed low-passed frequency bands in lower end machines, and progressively decoding higher and higher-passed frequency bands in progressively more powerful machines.

SUMMARY OF THE INVENTION

The present invention provides a system and a method for decompressing video segments including a sequence of difference frames. Selected scaling of frame resolution and color depth upon playback on a playback platform is simplified by the process. A frame header may indicate the computational complexity of decompression of a frame at a plurality of spatial resolutions and color depths. This allows selection by the decompressor of a scale for output resolution and another scale for color depth. Decompression proceeds by retrieving a frame from the compressed video stream in elementary units. Elementary units relate to non-overlapping rectangular areas of the frame to be decompressed. An elementary unit is characterized by type, including an unchanged type, a homogeneous type, a pattern type and a predetermined pattern type. For a retrieved elementary unit of the unchanged type, an output pointer to a display buffer is moved by an elementary unit scaled by the output resolution scale. For a retrieved elementary unit of the homogeneous type, a color retrieved from the compressed video stream is applied to an area in the display buffer corresponding to an elementary unit scaled by the output resolution scale.

For a retrieved elementary unit of the predetermined pattern type, a pattern from a table of patterns is retrieved using an index from the compressed video segment. Two colors for the pattern are also retrieved and applied to the pattern. The result is written to an area in the display buffer corresponding to an elementary unit scaled by the output resolution scale. For a retrieved elementary unit of the pattern type, a pattern is retrieved from the compressed video stream. Two colors are retrieved and applied to the pattern and the result is written to an area in the display buffer corresponding to an elementary unit scaled by the output resolution scale.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
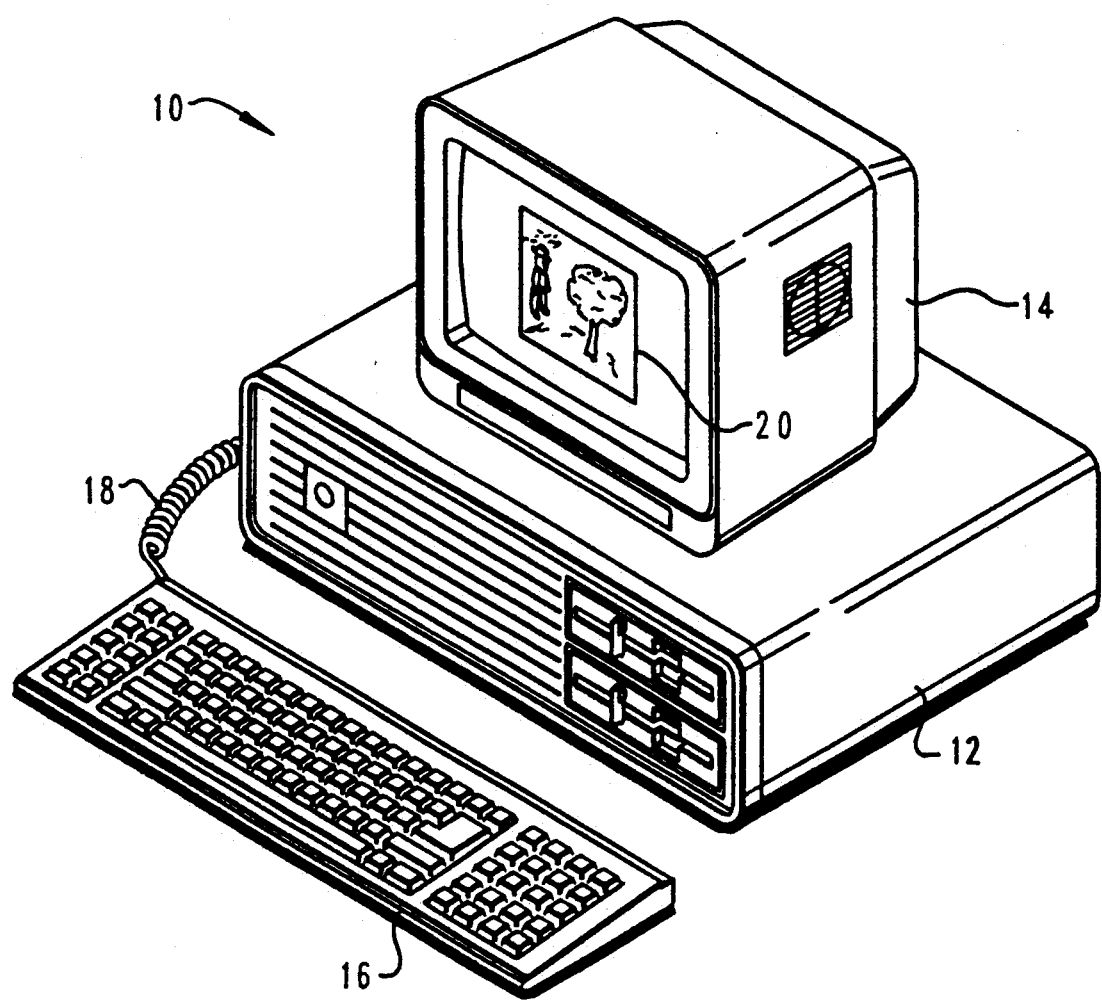
FIG. 1 is a pictorial view of a personal computer.

With reference now to the figures and in particular with reference to FIG. 1, there is depicted a pictorial representation of a personal computer system 10 which may be utilized in accordance with the method of the present invention. Personal computer system 10 includes a computer 12, preferably provided by utilizing an IBM Personal System 2 or similar system. Personal computer system 10 generally includes a video display 14 and a keyboard 16 connected to the computer by cable 18. Video display device 14 and keyboard 16 are utilized to allow user input to computer 12 and to provide user perceivable messages such as video segments 20.

Figure 2:
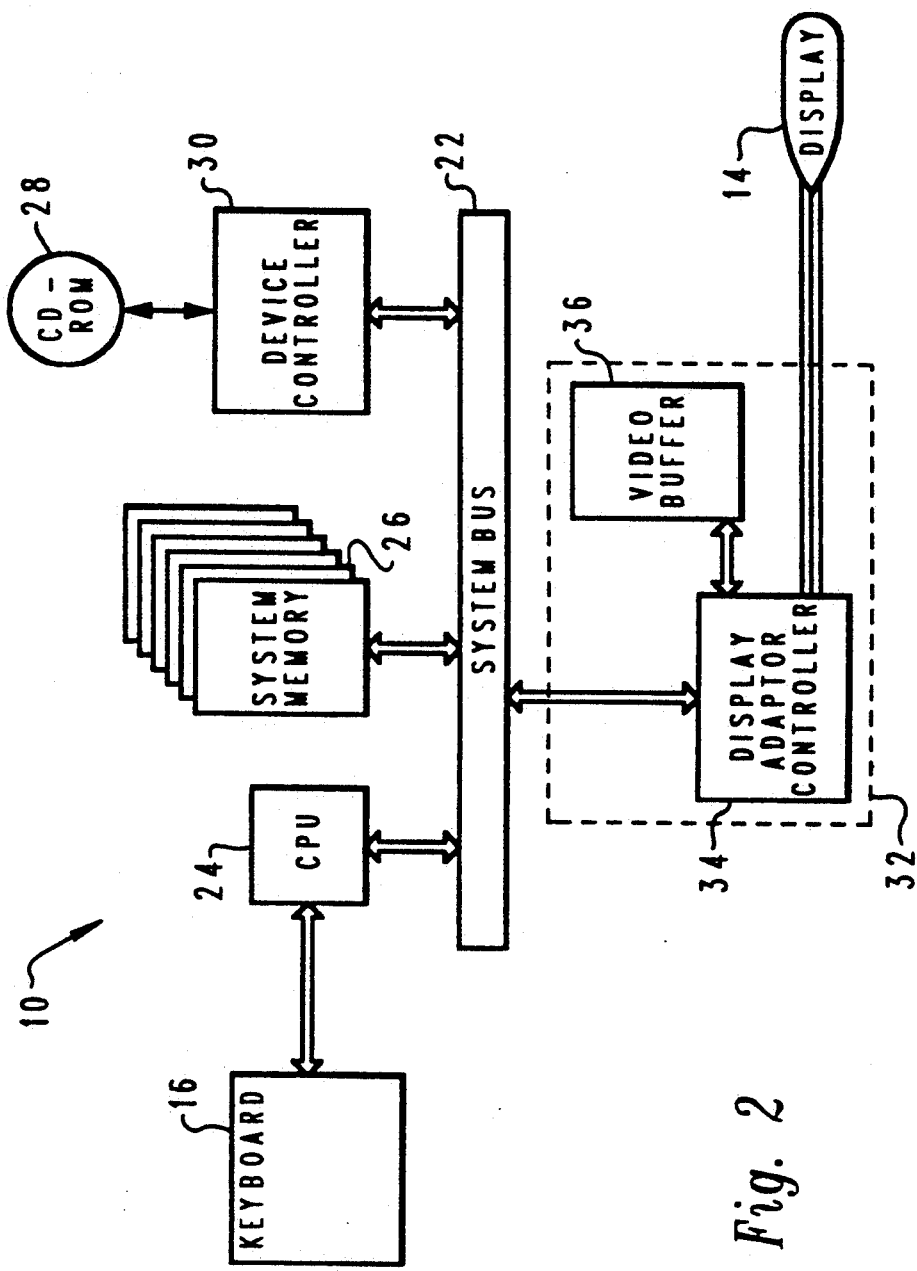
FIG. 2 is a block diagram of a data processing system for reproduction of video segments.

FIG. 2 is a block diagram of personal computer system 10. Computer system 10 is based on a system bus 22 on which data is passed between components of computer system 10. Among components connected to system bus 22 are a central processing unit (CPU) 24, which may be based on an Intel 8086/88 or more powerful microprocessor. CPU 24 executes programs stored in system memory 26 and manipulates data stored in system memory 26. A video segment may be stored in a compressed form on a compact disc-read only memory (CD-ROM) 28 which is accessed by CPU 24 through a device controller 30 connected to system bus 22. Depending upon the capability of the computer system, frames of a video segment stored on CD-ROM 28 may be transferred to system memory 26 for decompression by CPU 24 or to video buffer 36 in a display adaptor 32, where the data can be decompressed by a display adaptor controller 34. Depending on the system, video buffer 36 may or may not be available. Low capacity systems lacking such a video buffer require retrieval and decompression of a video segment through CPU 24 and system memory 26. Thus video data may be displayed on display 14 from system memory 26 or out of video buffer 36.

Figure 3:
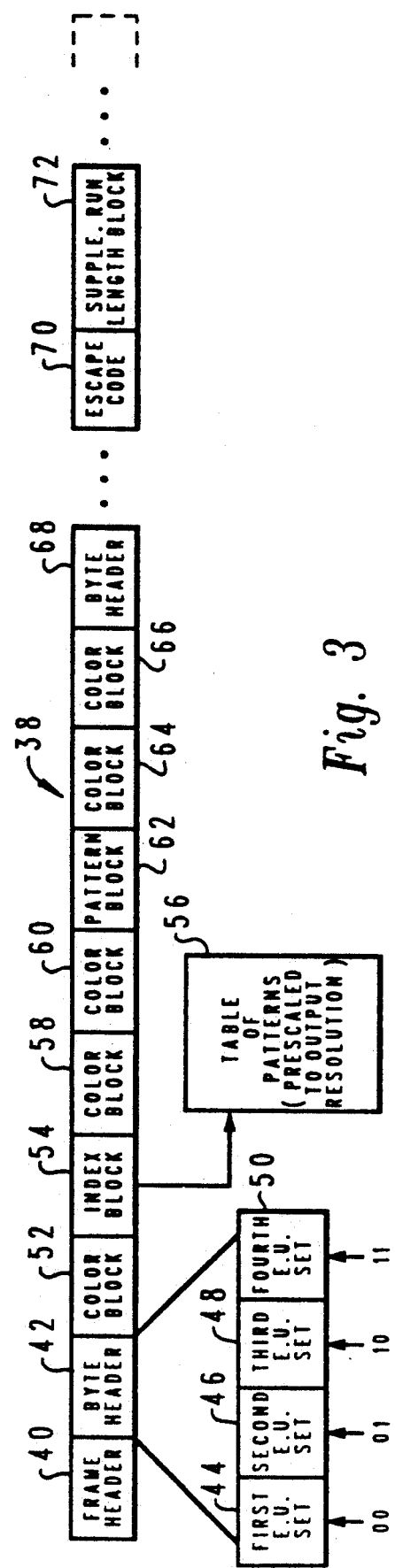
FIG. 3 is a schematic illustration of a protocol for a compressed video segment.

FIG. 3 illustrates a protocol for a compressed video data stream 38 which is decoded by the first and second embodiments of the present invention. During compression, each frame of a raw video sequence is analyzed by decomposing the frame into a plurality of non-overlapping, contiguous rectangular regions termed elementary units. Each elementary unit is a matrix of X columns by Y rows of pixels. Typically an elementary unit is a four by four matrix of pixels from a frame. The decompression platform will treat each frame as a matrix of such elementary units. According to the power of the computer, i.e. the number of instructions per second available to decompress a compressed video segment, the computer selects the appropriate scaling factor for which to reconstruct a video frame from the elementary units of the compressed video clip. The decompressor may require that elementary units be scaled to a smaller size in less powerful computers or may allow a larger size for more powerful computers. Generally, the same scaling factor is used to decompress all the frames in the video segment. However, each frame or set of consecutive frames in the video segment can contain information stating the number of operations required to decompress the frame or set of frames at different resolutions and/or color depths. This information will be available in a frame header 40. When this information is available, the decompressor may elect to adaptively change the scaling factors to provide higher video quality for some frames. The frame header may also include information relating to the size of the frame and the number of bytes in the compressed information blocks which follow a frame header.

If a video segment was compressed at 320×240 pixels and display at 640×480 pixels or any other level is desired, the appropriate parameters for scaling are computed once during decompression of a series of frames. The parameter of an elementary unit are modified once for a frame or segment.

In one embodiment, each elementary unit corresponds to one of four types: unchanged, homogeneous, pattern, or predetermined pattern. The type of each elementary unit is specified in the compressed video stream. All embodiments of the invention allow these four types of elementary units, and may add others. The playback platform is optimized for appropriate scaling to eliminate or minimize the computations required to adjust the size of each elementary unit during real-time playback.

The various embodiments of the invention specify position of elementary units in one of two ways. In the protocol of stream 38, elementary units are organized as quadruples which occur either: (1) sequentially in the X direction along a plurality of rows or (2) as quadrant sections of a two by two matrix of elementary units. Position in the final output display is then determined by position in stream 38. Following a frame header 40 is an exemplary byte header 42 which defines a quadruple elementary unit group. Byte header 42 includes four dyads 44, 46, 48 and 50. Each dyad can be set to one of four values ranging from 0 to 3. Each value corresponds to one of the four elementary unit types allowed by the protocol. As illustrated, dyad 44 is set to 0, dyad 46 is set to 1, dyad 48 is set to 2 and dyad 50 is set to 3, as indicated by binary representations of those numbers under the dyad. Position of a dyad in the sequence is linked to the position of the elementary unit in the eventual display field by a convention. An unchanged elementary unit requires no video data in stream 38 and accordingly none is supplied. Thus no blocks of data in stream 38 correspond to dyad 44. Scalability for an unchanged elementary unit is obtained by skipping the scaled elementary unit. Where stream 38 is used for an intraframe no dyads will have the value 0. An intraframe is a frame which has been spatially compressed rather than temporarily compressed. An intraframe would typically occur upon a change of scene.

Dyad 46 has the value 1, which indicates it corresponds to a homogeneous elementary unit. A homogeneous elementary unit is an elementary unit characterized by a single color value. Scalability of a homogeneous elementary unit is obtained by displaying the specified color over the scaled size of the elementary unit in the output display frame. Because a color must be specified for dyad 46, a color block 52 from stream 38 contains the color for dyad 46. Color may be coded either as an RGB8, an RGB16, an RGB24 format, or in a YUV16 or YUV24 format. Dyad 48 corresponds to the third elementary unit of a quadruple and has been set to the value 2 which corresponds to occurrence of a predetermined pattern elementary unit. The playback platform, upon occurrence of the value 2 in a dyad, will recover the next block from stream 38, which will be an index block 54 into a table of predetermined patterns 56 which resides in memory accessible to the decompressor. The table of patterns comprises a plurality of bit maps. The bit map in each pattern represents a scaled version of the elementary unit used during compression. The bit map has a pattern of ones and zeros which correspond to a first and second colors defined for the pattern. The playback platform will recover those colors from a color block 58 and a color block 60 and apply them respectively to the bits valued 1 and 0 in the pattern recovered from table 56. Scaling for predetermined pattern elementary units is accomplished by the playback platform invoking a version of the table of patterns that satisfies the condition that the size of each binary pattern equals the size of the scale of the size of the elementary unit in the reconstructed frame. Where an elementary unit is scaled down into a single pixel (i.e. a one by one region) the decompressor averages the two colors specified for the pattern.

A fourth dyad 50 is set to 3, which indicates that the elementary unit has a pattern block in the compressed stream 38. The playback platform recovers a pattern block 62 from the stream and two color blocks 64 and 66 as output values for a scaled output elementary units. A binary pattern of pattern block 62 is ordered in a raster scan of the elementary unit.

Pattern elementary units represent the greatest computational load for a decompressor to scale. To enable a wider spectrum of scalability, use of pattern elementary units in a compressed video segment is omitted or restricted. Where the number of pattern elementary units is restricted, scalability for pattern elementary units is obtained by scaling the binary pattern by a scale factor to satisfy the conditions that: (1) the average color in an elementary unit is preserved as closely as possible without modifying the specified color values; and (2) the direction of the gradient of the binary pattern prior to scaling is preserved as closely as possible after scaling. These conditions essentially dictate that the proportion of zeros and ones over the pattern be preserved as closely as possible and that the relative location of zeros and ones over the pattern be preserved as closely as possible. The gradient direction is defined as the angle specified by the arc tangent of the change, from bottom to top, of the binary values in the pattern over the change, from left to right, of the binary values in the pattern. The gradient direction is computed for vertical change as the sum of the binary values in the top half of the pattern minus the sum of the binary values in the bottom half. Similarly, the horizontal change can be calculated as the sum of the binary values in the left half subtracted from the right half. Scaling of color depth is obtained by storing color values as 16 bit color values rather than as 8 bit palettized values. If the display adaptor of the computer playback platform requires a different 16 bit color format, the conversion is performed using lookup tables. If the display adaptor of the computer playback platform requires an 8 bit index to a palette, it may be done with a set of precomputed lookup tables.

If the table of patterns 56 is limited in number, certain indices to the table may be designated as escape codes. Subsequent to a byte header 68, occurrence of an escape code 70 in the location of an index block is indicated. In some formats, the byte header could also have an 8 bit value which signifies an escape code. Such escape codes can indicate a number of things including, run lengths of elementary units which are unchanged or homogeneous. Subsequent to the escape code block a supplemental run length block 72 may be provided.

Figure 4A:
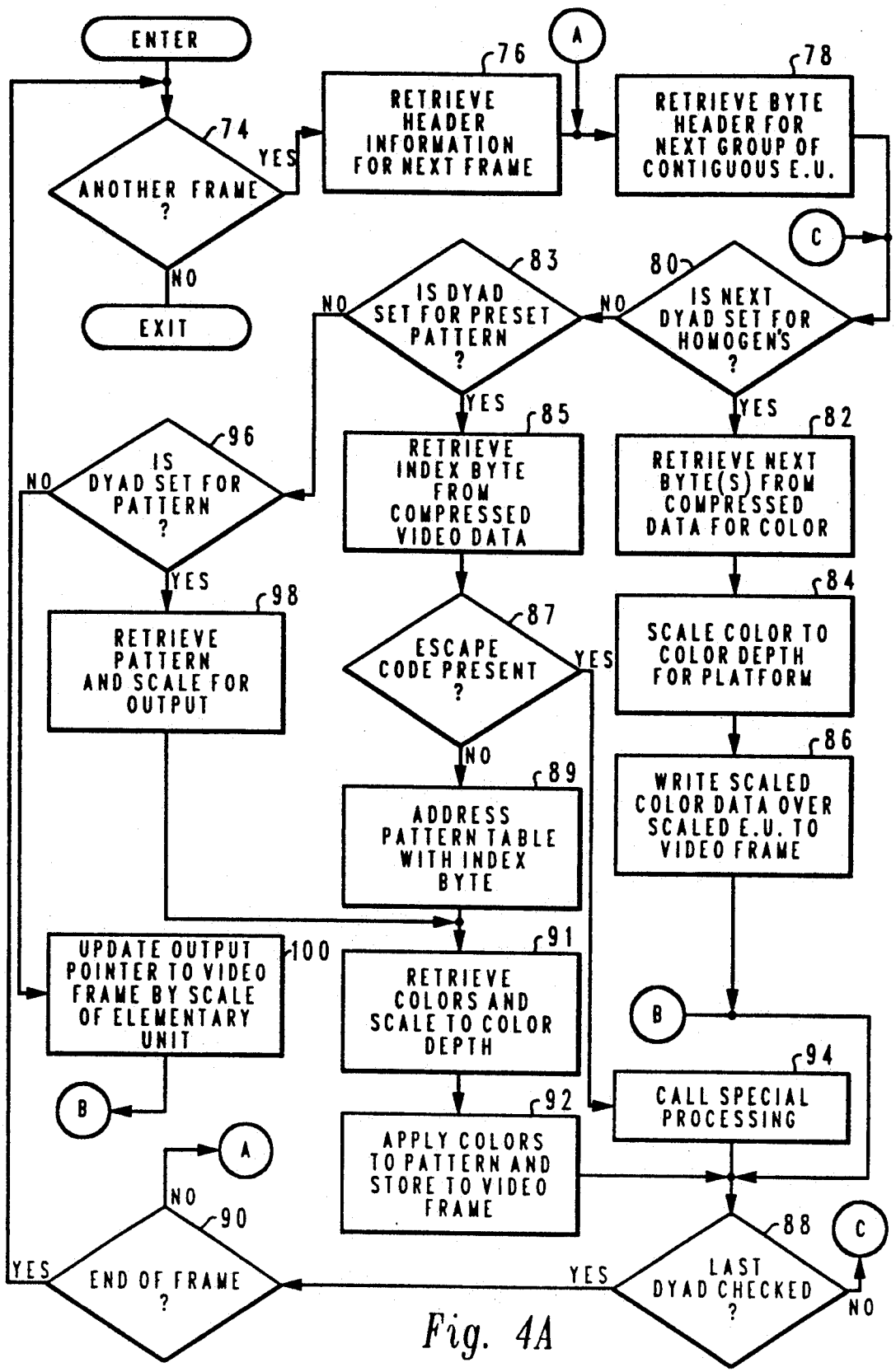
FIGS. 4A and 4B are a logical flow chart of a process for decompressing video data in accordance with a first embodiment of the invention.

A decoding process in accordance with a first embodiment of the invention is set forth in FIG. 4A. The process is entered with execution of step 74 where it is determined if a frame requires decompression. If no frame is present, the process is exited by the NO branch. If a frame for decompression is present from the stream, step 76 is executed to retrieve header information for the frame. As noted above such header information may indicate the number of instruction steps required to decompress the frame and thereby allow a playback platform to determine what scaling factor will be used. Next, at step 78 a byte header for a group of contiguous elementary units is retrieved. Each byte header contains four dyads, each one of which corresponds to one of the elementary units of the contiguous group. In step 80 the next (or first) dyad is compared with the value reserved for homogeneous elementary units. If a homogeneous value is indicated, the YES branch is followed to step 82 where a color block is retrieved from the compressed data stream. The block may consist of 1, 2 or 3 bytes of data depending on the color format. In step 84, the color is scaled to the color depth for the decompression process. One crude way of scaling color would be to lop off the least significant bits of each color specification. In step 86, the scaled color information is written over the predetermined scaled size of the elementary unit to the output video frame. Next, at step 88 it is determined if the dyad last examined was the last dyad in a byte header. If not the process returns to step 80. If it was the last dyad, the process is advanced to step 90 where it is determined if the end of the frame has been reached. If the end of the frame has not been reached, the process is returned to step 78. If the end of the frame has been reached, the process is returned to step 74 to determine if another frame requires decompression.

If a dyad is set for a value other than that reserved for homogeneous units, the NO branch from step 80 would have been followed to step 83. At step 83 a dyad value is compared to the value reserved for predetermined patterns. If a predetermined pattern is indicated the YES branch is followed from step 83 to step 85, where an index byte is retrieved from the compressed video data. In step 87 the value of the index byte is compared with codes reserved for escape codes. If no escape code is present, step 89 is executed to use the value of the index byte as an address into a pattern table that contains the scaled patterns. Next, two subsequent color blocks are retrieved from the compressed stream and scaled to the color depth in use. In step 92 the colors are applied to the pattern retrieved from the pattern table and the result is stored to the video frame. Again processing advances to step 88, and if necessary step 90, to determine if a last dyad in a byte header has been checked and if an end of frame condition has been reached.

Returning to step 87, if an escape code was present the YES branch is followed to step 94, which is a call to an escape code processing routine, described below with reference to FIG. 4B. After processing, the process is returned to step 94 for execution of steps 88 and 90.

If a dyad value matches neither that for homogeneous elementary units or that for preset patterns, the NO branches are followed from steps 80 and 83 to step 96. At step 96 it is determined if the dyad value matches the value reserved that set for patterns. If it does, the pattern is retrieved from a pattern block in the data stream which is then scaled for the resolution of the output video frame. Processing then continues with execution of steps 91 and 92 as before. If the value in the dyad does not match that used to indicate patterns, the NO branch from step 96 is followed to step 100. This would occur if the dyad value indicated occurrence of an unchanged elementary unit. In step 100 the output pointer to the video frame is moved by the scale of elementary units in the output video frame. In other words, the scaled elementary unit is skipped so whatever values are in the video frame at the corresponding locations are left unchanged. Processing then is advanced to steps 88 and 90 to determine if the dyad was the last dyad in a byte header and if an end of frame condition has been encountered.

Also notable is that the sequence of steps 80, 83, 96 and 100 can be ordered from the most probable elementary unit type to the least probable elementary unit type to optimize the decompressor. For instance, FIG. 4A can alternatively check first if the dyad is set for unchanged or elementary unit when a high level of temporal redundancy is expected.

Figure 4B:
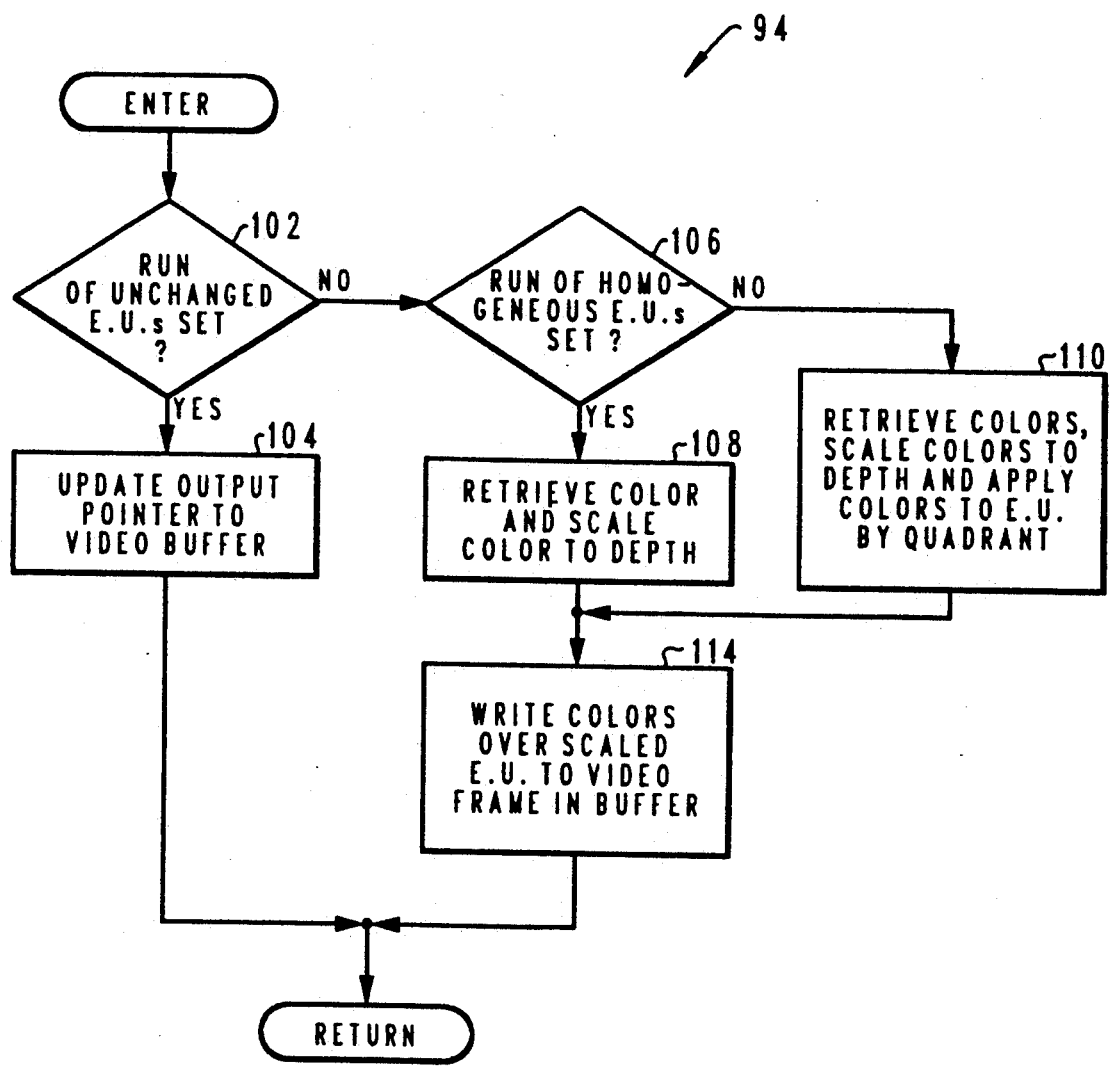

FIG. 4B illustrates the subprocess corresponding to the special processing of block 94 for escape codes. The process is entered at step 102 where it is determined if the code indicates a run of unchanged elementary units in the frame. If YES, the output pointer to the video buffer will be moved by the corresponding number of elementary units. Selected escape codes indicate that the following byte in the compressed stream continues the count of the number of elementary units in the run length for homogeneous or unchanged elementary units. The decompressor expects a single color value for the run length of homogeneous elementary units to occur after the number of elementary units in the run length has been determined. If the escape code value did not match those reserved for designating a run of unchanged elementary units, the NO branch from step 102 is followed to step 106 where it is determined if a run length of homogeneous elementary units has been designated. The YES branch from step 106 to step 108 results in retrieval of a color and in scaling of the color to a depth determined by the playback platform. In step 114 the color is written over the scaled size of the elementary unit to the video frame in the video buffer and processing is complete. The NO branch from step 106 is to step 110. Step 110 represents retrieval of two colors, scaling of the colors to a depth and application of the colors to an elementary unit by quadrants. Step 110 is used as a substitute for actual specification of patterns.

Also notable is that an index byte is reserved to specify an atypical encoding of a predetermined pattern elementary unit at the right most elementary unit of a quadruple set. The format of the atypical encoded predetermined pattern elementary unit is specified by its corresponding dyad in the byte header of the encoded quadruple set, and a run length escape code byte. If the escape code value is $FF_{HEX}$, it indicates that the following byte from stream 38 continues the count of the number of elementary units in the run length. After the color value of the run length of elementary units has been read from stream 38, the immediately following information relates to the specification for the right most elementary unit of the current quadruple set which is an index byte value into the table of patterns, followed by two color values for the pattern.

Color and luminance information in color video graphics are encoded using various RGB (red, green and blue) formats or YUV formats (luminance and two color difference values). Where the color value of a homogeneous elementary unit is specified using YUV24, the two color values for predetermined pattern or pattern elementary units are specified using 8 bits for a first luminance value information, 8 bits for a second luminance value, and 8 bits for each of the two color difference values. Thus further compression can be obtained over an RGB format.

The specification of pattern elementary units and predetermined pattern elementary units can be represented by the same value in a dyad of the byte header. Rather than using separate values to specify a predetermined pattern elementary unit and a pattern elementary unit, a single value can be employed to specify both type of elementary units. In such cases a value is freed to specify a fifth type of elementary unit. Differentiation between predetermined pattern and pattern elementary units is then obtained by constraining the first bit of the index byte of a predetermined pattern to 0 and the first bit of a binary pattern of pattern elementary unit information to 1. In this case the table of patterns is limited to 128 predetermined binary patterns. During video compression, the first bit of the binary pattern of a pattern elementary unit is checked. Since the first value of a pattern elementary unit is associated with the 0 bits in the binary pattern and the second color value is associated with the 1 bits of the binary pattern, the following procedure is performed during compression: if the value is 0 in the first bit of a pattern, then the binary pattern is negated and the order of the color values is swapped.

Figure 5A:
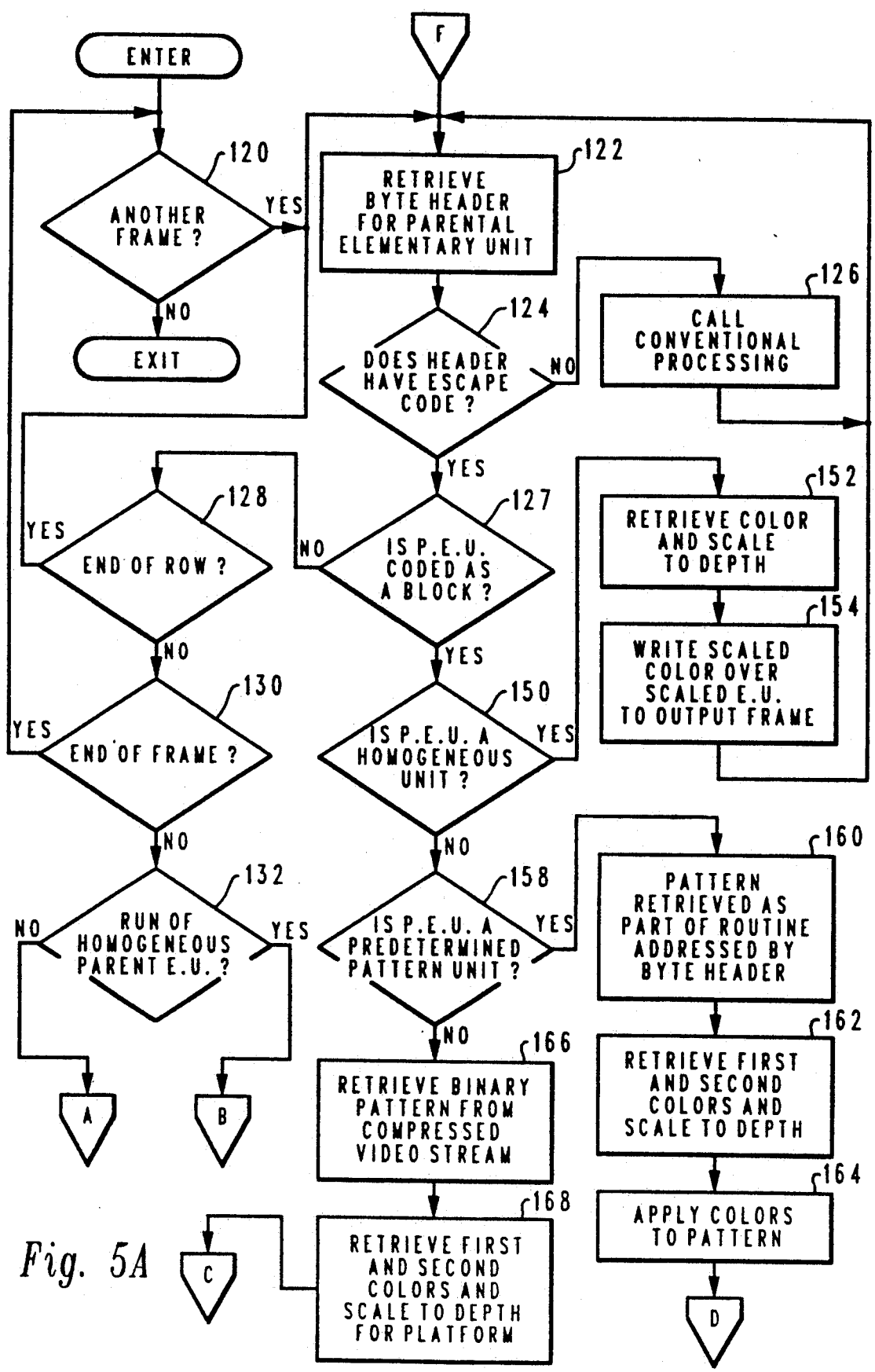
FIGS. 5A, 5B and 5C are a logical flow chart of a process for decompressing video data in accordance with a second embodiment of the invention.
Figure 5B:
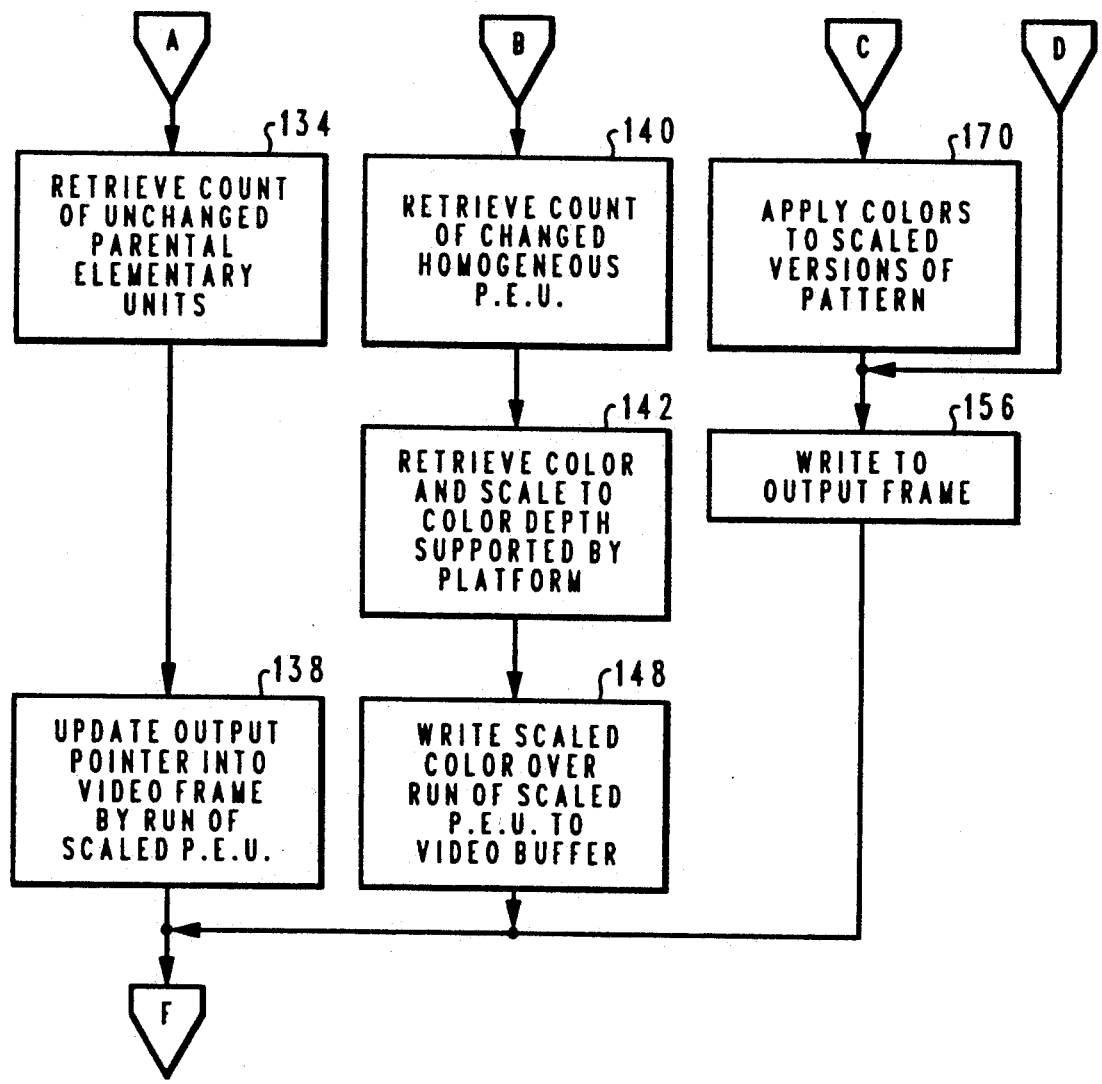
Figure 5C:
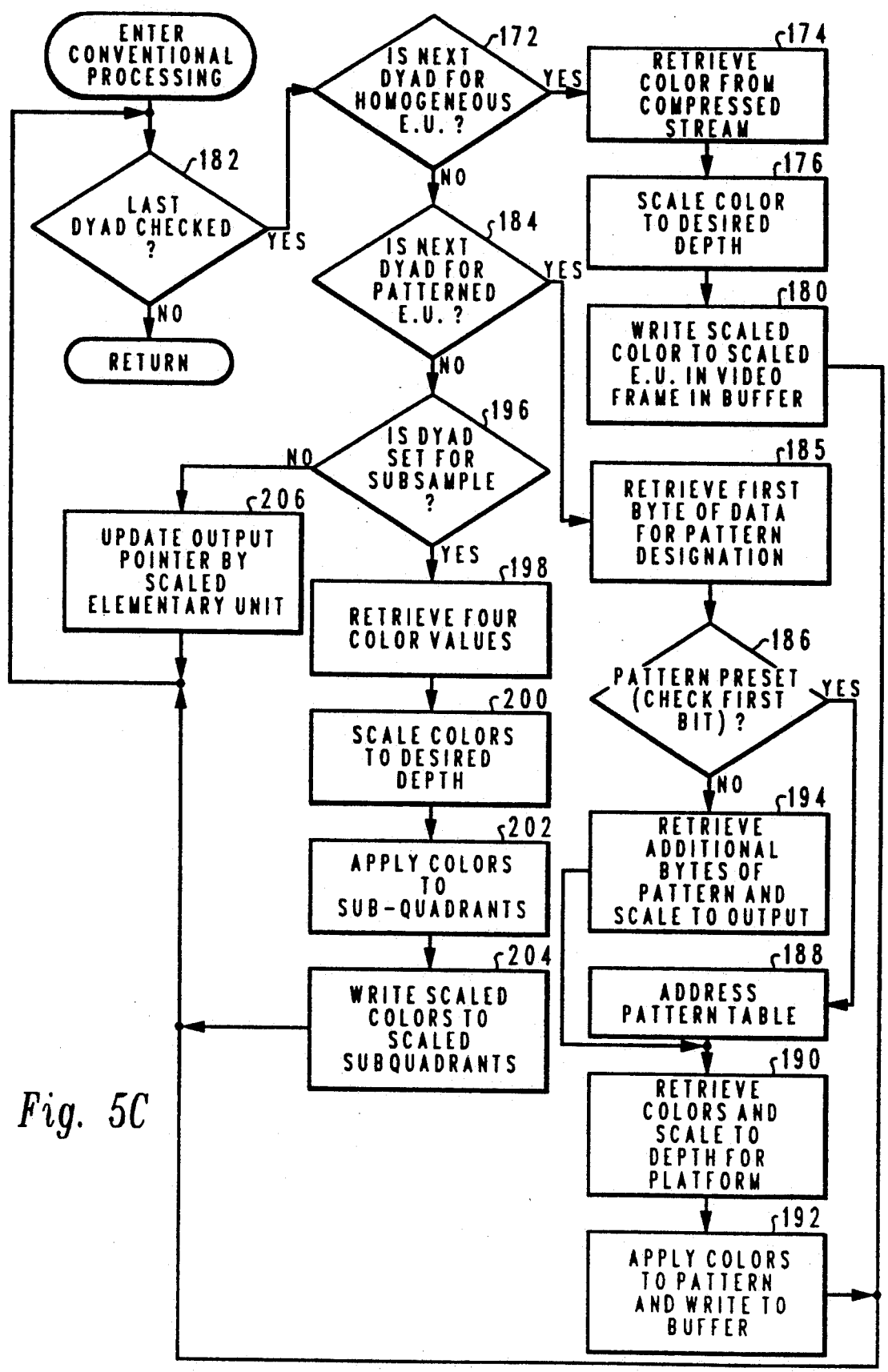

FIGS. 5A, 5B and 5C illustrate a logical process wherein the video stream definition includes parent elementary units consisting of the northwest, northeast, southwest and southeast elementary units of a larger rectangular region. The format of the encoded video frame data is a sequence of all non-overlapping parent elementary units in the frame, each encoded as described below, and ordered in a raster scan of the grid of parent elementary units in a video frame. Typically, an elementary unit will equal four by four pixels. A parent elementary unit therefore is eight by eight pixels. An encoded parent elementary unit consists of a byte header which specifies how the corresponding parent elementary unit is encoded, or how each of the four elementary units of a size equal to 4×4 pixels that form the parent elementary unit have been encoded, followed respectively by the encoded parent elementary unit or by the four encoded elementary units ordered in the sequence northwest, northeast, southwest and southeast.

When a parent elementary unit is encoded as four elementary units of a size equal to 4×4 pixels, the byte header for the parent elementary unit consists of 4 dyads, which specify types for the elementary units in the same sequence set forth above. Dyad values may be 0, indicating an unchanged elementary unit, 1 indicating a homogeneous elementary unit, 2 indicating a pattern (either a predetermined pattern or a pattern elementary unit), and 3 indicating a subsampled four by four region. An encoded subsampled four by four elementary unit is specified by its corresponding dyads in the byte header and 4 color values. In a subsampled elementary unit, one color value applies to each two by two pixel region in the elementary unit. Scalability is obtained by displaying each specified color over the scaled size of the two by two pixel region.

The video compression process does not compress a video clip with subsampled four by four elementary units and patterned elementary units within the same parent elementary unit. Therefore, the dyad code 2 will never appear in the same byte header as the dyad code 3 as a result of such an occurrence. Such an occurrence instead signifies encoding of a parent elementary unit as an eight by eight encoded region, or the occurrence of escape codes that signify the end of a row, the end of a frame, a run length of homogeneous parent elementary units, or run length of unchanged parent elementary units. Any combination of the values 2 and 3, in any order, within the 4 dyads of a byte header, may specify one of these special operations. This has use for real-time video decompression and playback in low end playback platforms. By having 256 optimized routines for each configuration of the byte header, a video decompressor does not have to check the byte header for all potential combinations of the values 2 and 3, but rather uses the byte header value as an address into the corresponding optimized routine.

A parent elementary unit encoded as an eight by eight region consists of a byte header that contains at least one dyad equal to 2 and another equal to 3. If the unit is a homogeneous parent elementary unit, a single color value follows the byte header. A parent elementary unit that is a predetermined pattern parent elementary unit is specified by: the byte header, which inherently specifies a particular predetermined pattern that is included as part of the corresponding optimized routine, followed by the first color value for the pattern and the second color value for the pattern. A parent elementary unit that is a patterned parent elementary unit is specified by the byte header, an eight by eight binary pattern, ordered in the quadrant sequence: northwest, northeast, southwest and southeast. Each quadrant is ordered in a raster scan of the quadrant, followed by the first color value for the pattern and the second color value for the pattern.

The decompression process is entered at step 120 of FIG. 5A, where it is determined if a frame of video information requires decompression. The YES branch from step 120 is followed to step 122 to retrieve a byte header for a parental elementary unit. At step 124 it is determined if the byte header corresponds to an escape code. If not, the NO branch is followed to step 126 which is a call to conventional processing. Conventional processing corresponds to the process of FIG. 5C, which is executed as a subroutine to the process of FIG. 5A. After execution of conventional processing the process is returned to step 122. If a byte header does contain an escape code, the YES branch from step 124 is followed to step 127. In step 127 it is determined if the parent elementary unit is coded as a block. If it is not, processing is advanced to step 128 where it is determined if the escape code indicates an end of row. If YES the information is used to position the output pointer to the video buffer appropriately. Processing is returned to step 122. If the code does not indicate an end of row, step 130 is executed to determine if an end of frame has been reached. If YES the output pointer to the video buffer is reset to the beginning of the buffer and processing is returned to step 120.

The NO branch from step 130 advances processing to step 132, where it is determined if a run of homogeneous parent elementary units is present. If the code does not match that for a run of homogeneous parent elementary units the NO branch is followed to step 134 of FIG. 5B. A count of unchanged parental unit is retrieved in step 134. In step 138 the output pointer is moved a corresponding number of parent elementary units. Processing is then returned to step 122 to retrieve another byte header.

The YES branch from step 132 advances processing to step 140 in FIG. 5B where a count of the changed homogeneous parent elementary units is retrieved. Next, at step 142, a color for the parent elementary units is retrieved and scaled to the color depth desired. Next, step 148 is executed to write the scaled color of the run of homogeneous parent elementary units to the output video buffer. Again processing is returned to step 122.

Returning to step 127, in the situation that a parent elementary unit has been coded as a block, the YES branch is followed to step 150 where it is determined if the parent elementary unit is homogeneous. If it is homogeneous, the YES branch is followed from step 150 to step 152 where a color is retrieved and scaled to the desired depth. Next, in step 154 the scaled color is written over the scaled parent elementary unit in the output video frame. Next, processing is returned to step 122.

The NO branch from step 150 is followed to step 158 for determination if a parental elementary unit is a predetermined pattern unit. If it is, the value of the byte header will serve as an address to a routine which is optimized for that pattern as indicated by step 160. Next, step 162 is executed to retrieve first and second colors from the compressed video data segment and to scale those colors to the desired depth. Next, step 164 is executed to apply the first and second colors as scaled to the pattern. The data is written to the output frame with execution of step 156.

If at step 158 is was determined that the parental elementary unit is not a predetermined pattern unit, the NO branch is followed to step 166 for retrieval of a binary pattern from the compressed video stream. In step 168, first and second colors are retrieved from the compressed video segment and scaled to the desired depth. Next, with execution of step 170, the colors are applied to the scaled version of the pattern and the result is written to the output video frame in step 156.

FIG. 5C illustrates the subroutine represented by block 126 in FIG. 5A. The process is entered at step 182 with determination if the last dyad has been checked. If not, step 172 is executed to determine if the dyad value is equal to that for homogeneous elementary units. If YES, step 174 is executed to retrieve a color from the compressed stream. At step 176 the retrieved color is scaled to the desired depth. In step 180, the scaled color data is written over the scaled elementary unit to the video frame in the video buffer. The process then returns to step 182 to determine if the dyad was the last in the byte header. If it was, processing is then returned to step 122 of FIG. 5A.

The NO branch from step 172 is followed in all other cases. At step 184 it is determined if the value of the dyad indicates a pattern elementary unit. If YES, the next byte in the stream is retrieved in step 185 and step 186 is executed to determine if the pattern is a predetermined pattern. If it is, the YES branch is followed to step 188 to address the pattern table with the retrieved byte. Next at step 190, the two colors for the pattern are retrieved from the compressed video segment and are scaled to the desired color depth. In step 192 the colors are applied to the scaled pattern and stored to the frame in the video buffer. Processing is then advanced to step 182 to determine if the dyad was the last in the byte header. The NO branch from step 186 advances processing to step 194 for retrieval of additional bytes from the compressed stream that make the pattern. Subsequent to retrieval of a pattern, colors are retrieved and scaled to the desired depth and those colors are then applied to the pattern. This processing is similar to steps 190 and 192 except that the pattern must be scaled to satisfy the output resolution of the video frame in the buffer.

The NO branch from step 184 advances processing to the decision step of 196. In step 196 it is determined if the dyad value is set to indicate four by four subsampling. If it is, the YES branch is followed to step 198 to retrieve four color values from the compressed video segment. Following step 198, step 200 is executed to scale the retrieved colors to the depth desired. Next, in step 202, the colors are applied to the 4 two by two subquadrants of the elementary unit. In step 204, the scaled color is written to the scaled subquadrants in the video frame buffer. Processing is then returned to step 182 to determine if the last dyad has been executed.

The NO branch from step 196 is followed when unchanged elementary units are indicated by the value in the dyad. In step 206 the output pointer to the video buffer is moved by the appropriate number of elementary units. Step 182 is then executed to determine if the last dyad has been processed.

It is notable that FIGS. 5A, 5B and 5C are preferably executed with 256 optimized routines, one for each byte header value, which consequently eliminates checking how an elementary unit is encoded in the parent elementary unit or how the parent elementary unit is encoded.

Figure 6A:
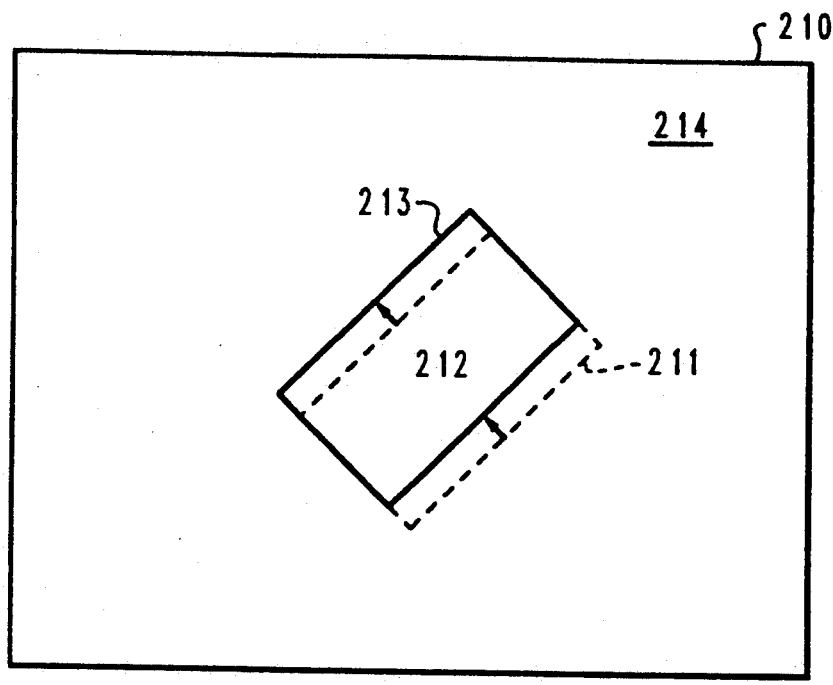
FIGS. 6A and 6B are a schematic illustration of derivation of a difference bit map for a frame of video data.
Figure 6B:
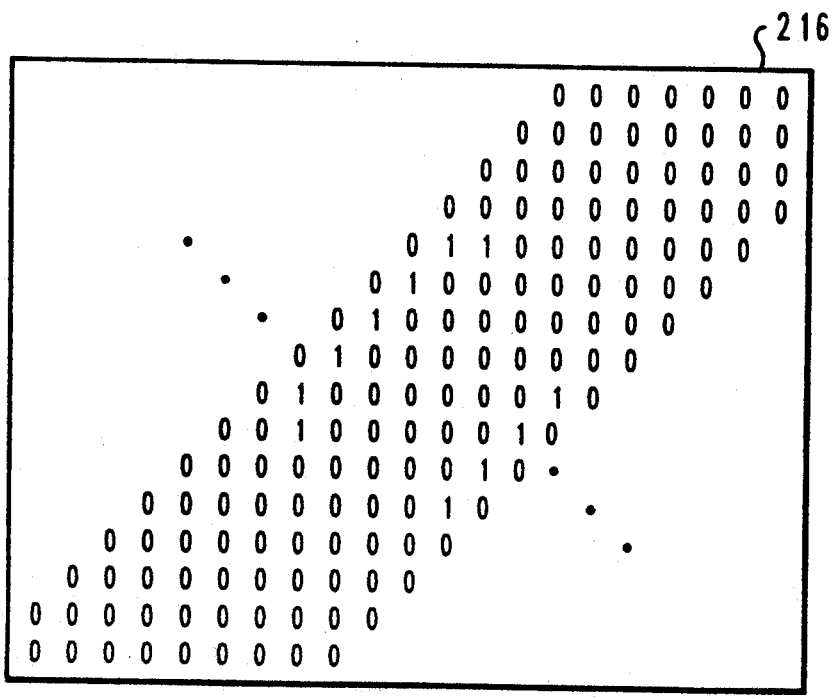

A third embodiment of the invention provides decompression of a video segment compression protocol utilizing a least significant color bit in color information for elementary unit type categorization. The first entity of a compressed video data segment for a frame that contains unchanged elementary units is called a frame differencing bit map. A frame differencing bit map contains a bit for each elementary unit in the video frame. A bit is false in the frame differencing bit map if the corresponding elementary unit it represents did not differ from the compared preceding frame. The representative bits in the frame differencing bit map are ordered by performing a rester scan on the grid of elementary units in a video frame. The sequence of elementary units corresponding to 1 bits in the bit map indicate changed locations. If a frame contains no unchanged elementary units it is called an intraframe. An intraframe contains no frame differencing bit map but does contain a sequence of all elementary units in the frame ordered in a raster scan of the grid of elementary units. FIGS. 6A and 6B illustrate generation of a frame differencing bit map. FIG. 6A illustrates a display frame 210 wherein a homogeneous region 212 has moved between positions 211 and 213 in sequential frames against a homogeneous background 214. FIG. 6B is a frame differencing bit map 216 corresponding to display video frame 210. All bit locations of the bit map are 0 except along the leading and trailing edges of homogeneous region 212 perpendicular to the direction of movement of the region.

Figure 7A:
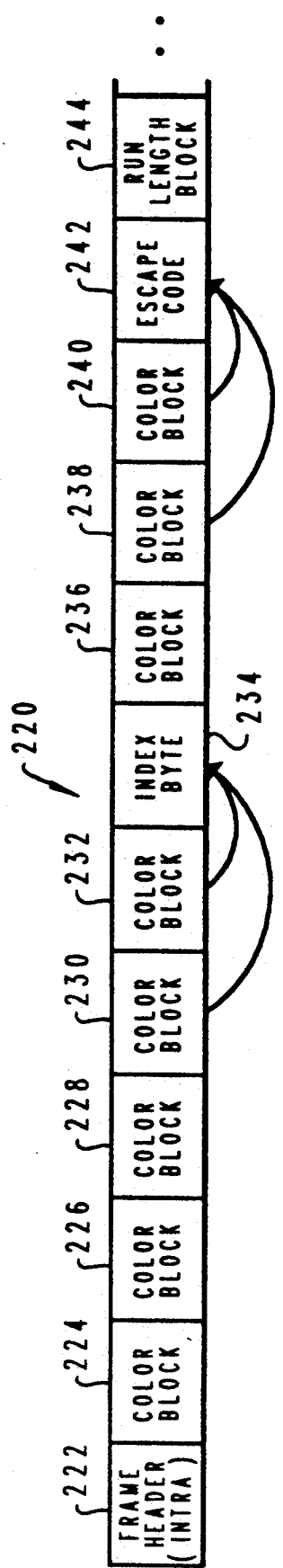
FIGS. 7A and 7B are a schematic illustration of a protocol for a compressed video segment in accordance with a third embodiment of the invention.
Figure 7B:
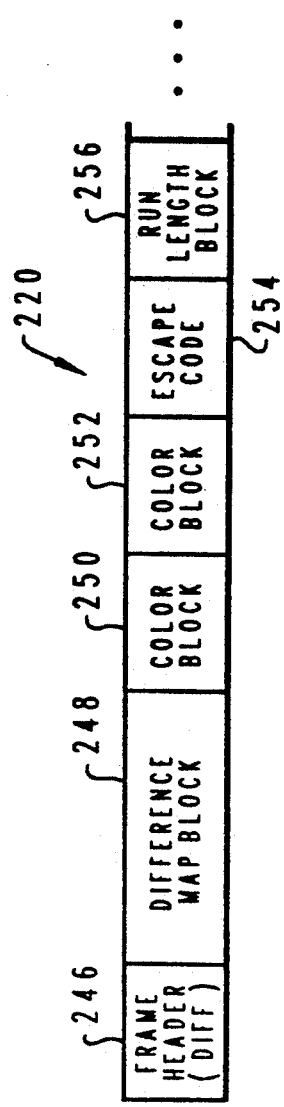

FIGS. 7A and 7B illustrate a compressed video stream in accordance with the protocol used by the third embodiment of the invention. A frame header 222 in compressed video segment 220 indicates whether the subsequent video information relates to an intraframe or a difference frame. Block 222 is indicated as relating to an intraframe. Accordingly video information follows immediately after the frame header and consists of a series of color blocks, index bytes, escape code bytes and run length blocks 224 through 244. Video segment 220 will also include frame headers 246 indicating difference frames. Following block 246 is a difference map block 248. Following the difference map block is assorted video information in code bytes 250 through 256.

The least significant color bit of the specified color space is employed in encoding of elementary units to denote the different types of elementary units. Examples of least significant color bits for some color spaces are: for an RGB16 color space having a format of 5 red bits, 6 green bits and 5 blue bits, the least significant green bit; for RGB15, the so-called "don't care bit", and for a YUV24 format, the least significant luminance bit is used. In general, the least significant color bit is assigned to a "don't care bit", or else to the color with the most bits, or where the color values all have the same number of bits, to the blue color value or the luminance value.

The first entity of an encoded elementary unit is always a color value of the specified color space. A homogeneous elementary unit is specified by a first color value with a least significant color bit equal to 1. The format of a predetermined pattern elementary unit is specified by two colors followed by an index byte. The first color value will have its least significant color bit set to 0 and the least significant color bit of the second color value set equal to 1. An index byte follows the two color values and will represent an offset into a table of patterns. The first color is then associated with the 0 bits in the binary pattern taken from the table whereas the second color is associated with the 1 bits. As before, selected offsets may be reserved as escape codes. The escape codes may be used to specify run lengths of homogeneous elementary units or run lengths of unchanged elementary units.

A pattern elementary unit is specified in the compressed video segment by two color values followed by a binary pattern block. Presence of the binary pattern block is indicated by setting the least significant color bit of both the first and second color values to 0. The binary pattern of the binary pattern block will again be ordered in a raster scan of the elementary unit. The first and second colors are assigned to the binary pattern as determined by the pattern of zeros and ones.

Utilization of the least significant color bit in the second color value can be relinquished by encoding predetermined pattern and pattern elementary units by constraining the first bit of index bytes and binary patterns to 0 and 1, respectively, as described above.

Figure 8:
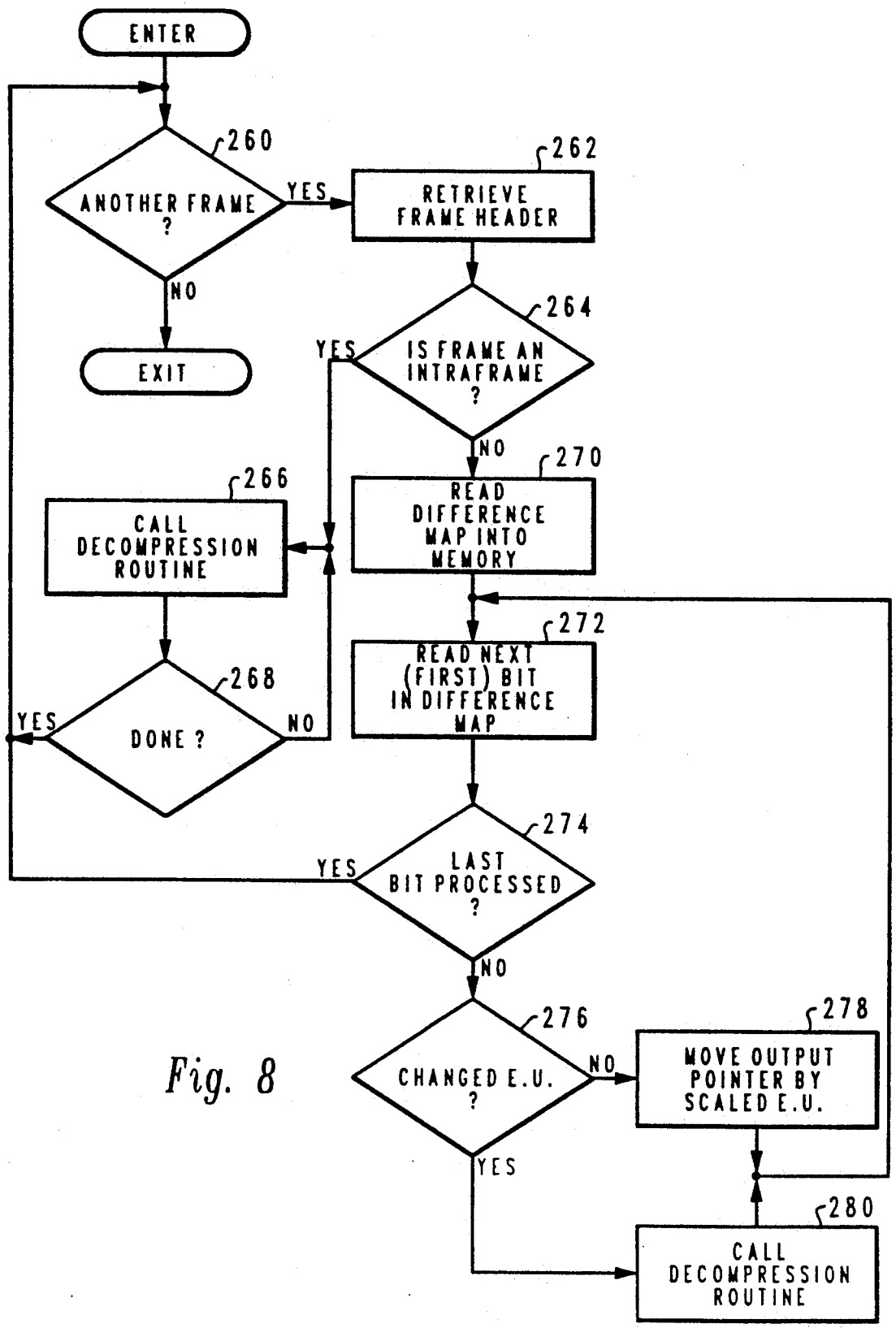
FIG. 8 is a logical flow chart of a process for decompressing video data compressed in accordance with the protocol of FIG. 7.
Figure 9:
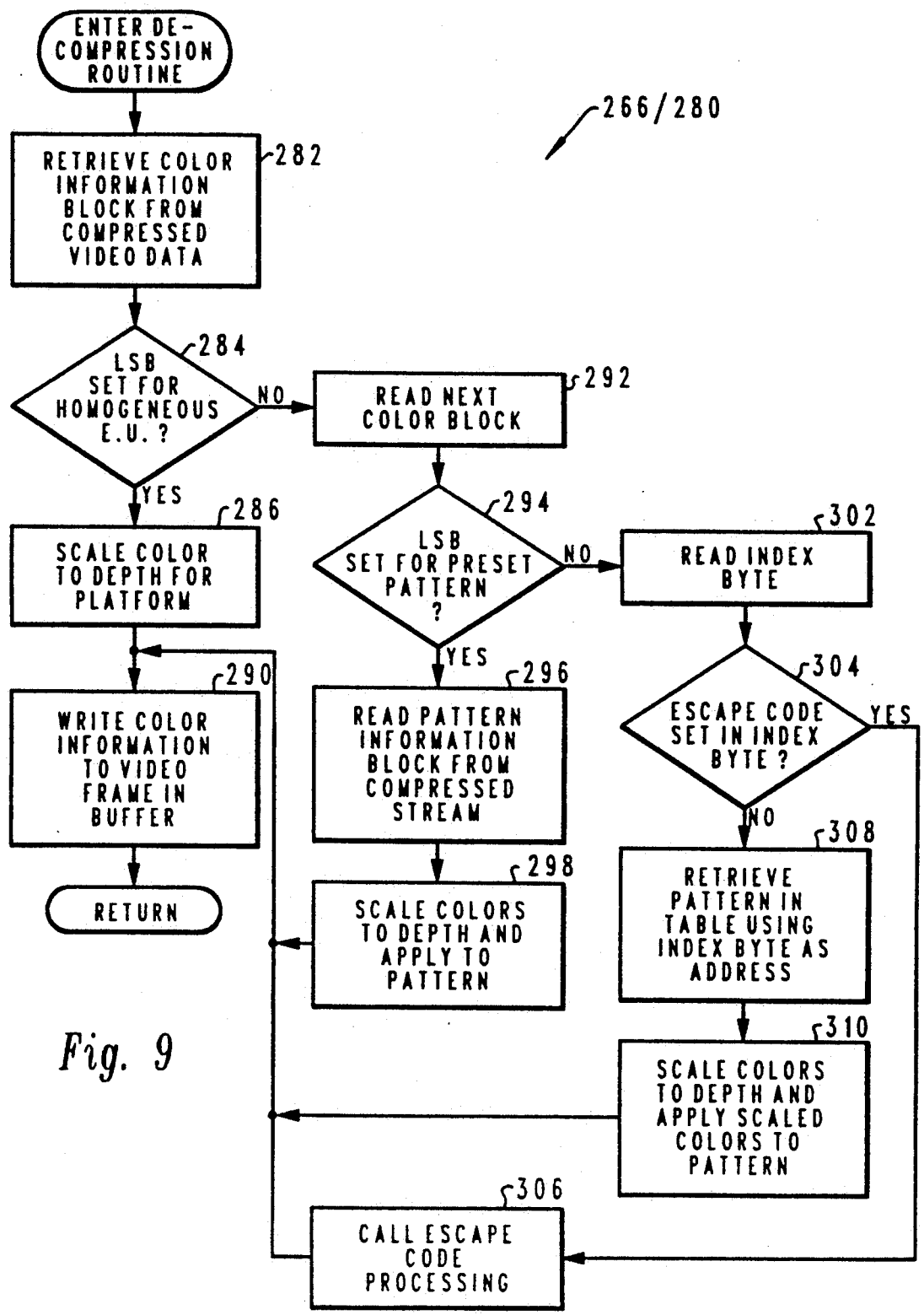
FIG. 9 is a continuation of the logical flow chart of FIG. 8.
Figure 10:
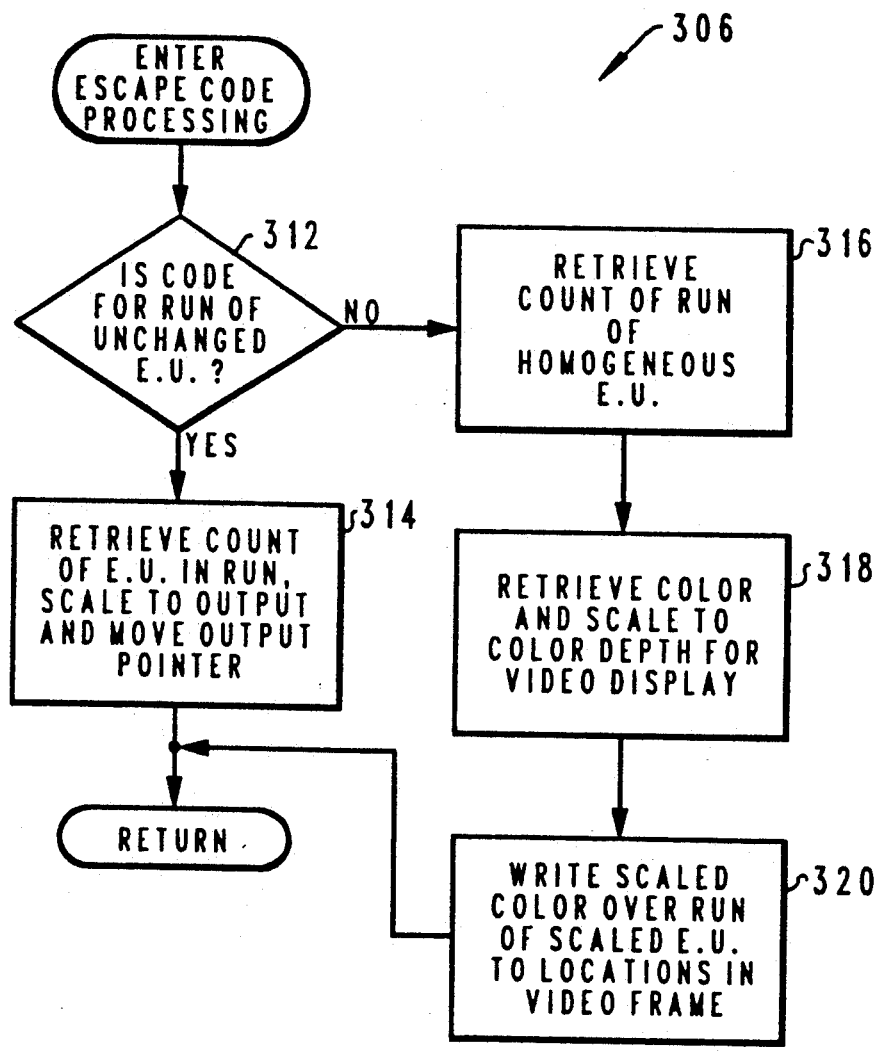
FIG. 10 is a continuation of the logical flow chart of FIG. 8.

FIGS. 8, 9 and 10 illustrate a logical flowchart for a process for decompressing a compressed video segment in the protocol of FIG. 7. The decompression process is entered at step 260 with the determination if a frame is presented for decompression. The process is exited along the NO branch if no frame is available. If a frame is available for decompression the YES branch is followed to step 262 to retrieve the frame header. In step 264 it is determined if the frame is an intraframe. If it is an intraframe, processing advances to step 266 which is a call to the decompression routine illustrated in connection with FIG. 9. The decompression routine returns processing to step 268 after decompression of each elementary unit of the intraframe. When all the elementary units of an intraframes have been processed, the YES branch is followed from step 268 back to step 260. As long as elementary units remain in the intraframe requiring decompression, the NO branch is followed from step 268 back to step 266 for another call to the decompression routine. If a frame is a difference frame, the NO branch is followed from step 260 forward to step 270. In step 270, the difference map block is read into memory from the compressed video segment. In step 272, the next (or first) bit in the difference map is read. Then, step 274 is executed to determine if the bit map has been exhausted. If it has, the YES branch is followed back to step 260 for retrieval of another frame. If the bit map has not been exhausted the NO branch is followed from step 274 to step 276. At step 267 it is determined if the bit indicates a changed elementary unit. If not, the NO branch is followed to step 278 to move the output pointer to the video buffer by the resolution scale of elementary units in the output frame. Processing is then returned to step 272 to retrieve the next bit of the difference map. If a changed elementary unit is indicated in step 276 the YES branch is followed to step 280 to call the decompression routine of FIG. 9.

The decompression routine of blocks 266 and 280 is illustrated by the logical flowchart of FIG. 9. The process is entered with execution of step 282 which is the retrieval of a color information block from the compressed video data. In step 284 the least significant color bit from the color information block is checked to determine if the elementary unit is homogeneous. If YES, step 286 is executed to scale the color to the desired depth for the decompression platform. Next, step 290 is executed to write the scaled color information over the scaled elementary unit to the video frame in the buffer. Processing is then returned to the appropriate location in step 280.

If in step 284 the least significant bit was not set for a homogeneous elementary unit, the NO branch is followed to step 292 to read the next color block in the compressed video segment. In step 294 the least significant color bit of the second color block is checked to determine if it is set for a predetermined pattern.

If the least significant bit of the second color block is not set for a predetermined pattern, step 296 is executed to read pattern information from a block in the compressed video segment. In step 298 the color information is scaled to the desired depth and applied to the pattern. Next step 290 is executed to write the color information to the video frame and processing is then returned to FIG. 8 at the appropriate location.

If the least significant bit in the second color block was determined in step 294 to be set for a predetermined pattern, the YES branch is followed to step 302 to read an index byte from the compressed video segment. In step 304, it is determined if the index byte is set to an escape code. If YES, step 306 is executed to call escape code processing. If not, the NO branch is followed from step 304 to step 308 to retrieve a pattern in a table of patterns. Next, in step 310 the colors of the first and second color bytes are scaled to the desired depth and applied to the pattern. Step 290 is then executed to write the information to the video frame in the video buffer.

FIG. 10 illustrates a logical process for escape code processing corresponding to block 306 in FIG. 9. The process is entered with execution of step 312 where it is determined if a code for a run of unchanged elementary units was presented. If YES the count of the run of elementary units is retrieved and the output pointer is moved by the appropriate number of locations in the video buffer. Processing is then returned to the appropriate location in FIG. 9. If the code was for a run of homogeneous elementary units, the NO branch is followed from step 312 to step 316 where a count is retrieved of the homogeneous elementary units. Next, step 318 is executed to retrieve the color and to scale the color to the color depth desired for the video display. Next, step 320 is executed to write the scaled color information over the run of elementary units in the corresponding locations of the video frame. Processing is then returned to the appropriate location of FIG. 9.

It is notable that the invention provides a scalable decompressed video stream as a byte stream rather than a bit stream. This greatly enables ease of decoding for implementations on low capacity playback platforms. The method provides decompression of a compressed digital video segment at different frame resolutions, at different color depths scales, or both. The scale can be changed from frame to frame depending upon processing demands on the playback platform. The method is highly suitable to multimedia applications in both low end personal computers and in more elaborate workstation environments.

While the invention has been particularly shown and described with reference to a preferred embodiment, it will be understood by those skilled in the art that various changes in form and detail may be made therein without departing from the spirit and scope of the invention.

What is claimed is:

1. A method of decompressing a compressed video segment including a sequence of frames with selected scaling of frame resolution and color depth for playback on a playback platform, the method comprising the steps of:
   generating an output resolution scale for a frame;
   retrieving the frame from the compressed video stream in elementary units;
   determining a display type for each retrieved elementary unit, the display types including an unchanged type, a homogeneous type, and a pattern type;
   for a retrieved elementary unit of the unchanged type, moving an output pointer to a display buffer by an elementary unit scaled by the output resolution scale;
   for a retrieved elementary unit of the homogeneous type, applying a color retrieved from the compressed video stream to an area in the display buffer scaled by the output resolution scale; and
   for a retrieved elementary unit of the pattern type, retrieving a pattern from the compressed video stream and applying the pattern to an area in the display buffer scaled by the output resolution scale.

2. A method as set forth in claim 1, wherein the display types further includes a predetermined pattern type, the method further comprises the step of:
   for a retrieved elementary unit of the predetermined pattern type, retrieving a pattern from a table of patterns using an index retrieved from the compressed video segment and applying the pattern to an area in the display buffer scaled by the output resolution scale.

3. A method as set forth in claim 2, wherein a predetermined pattern and a pattern are each mapped by a binary bit map, and further comprising:
   for a retrieved elementary unit of the pattern type or the predetermined pattern type, applying first and second colors retrieved from the compressed video segment to the off and on values, respectively, of the binary bit map; and
   setting a color depth for colors upon retrieval from the compressed video segment.

4. A method as set forth in claim 3, wherein the step of determining a display type for each retrieved elementary unit comprises:
   retrieving from the compressed video segment an elementary unit group block header wherein the block header is divided into a sequence of segments, each segment corresponding to an elementary unit for the frame and each segment having a value corresponding to a display type.

5. A method as set forth in claim 4, and further comprising:
   determining an order for display of the elementary units of an elementary unit group from the sequence of the segments in a block header.

6. A method as set forth in claim 5, wherein the order is in the direction of rows of a frame.

7. A method as set forth in claim 5, wherein the order is for quadrants of a rectangular group of elementary units.

8. A method as set forth in claim 7, wherein the display types for an elementary unit further include a subsampled type, and further comprising:
   responsive to determination that an elementary unit is of the subsampled type, recovering four colors for the elementary unit and applying one each of the colors to each of four quadrants of the elementary unit.

9. A method as set forth in claim 8, and further comprising:
   upon detection of codes for both the pattern or predetermined pattern type and the subsampled type in a block header, applying subsequent video information retrieved from the compressed video segment to group of elementary units covered in a block header as a group.

10. A method as set forth in claim 3, wherein the step of determining a display type for each retrieved elementary unit includes:
    retrieving a first color information block for an elementary unit from the compressed video segment;
    determining from a least significant bit for a color or luminance value in the first color information block whether the elementary unit is of the homogeneous type;
    in response to determination that the elementary unit is not of the homogeneous type, retrieving a second color information block for the elementary unit; and determining from a least significant bit for a color or luminance value in the second color information block whether the elementary unit is the pattern or predetermined pattern type.

11. A method as set forth in claim 10, and further comprising:

responsive to determination that an elementary unit is of the predetermined pattern type, retrieving a pattern using an index recovered from the compressed video segment into a table of patterns;

responsive to determination that an elementary unit is of the pattern type, retrieving a pattern from the compressed video segment; and applying colors defined by the first and second color information blocks to the pattern.

12. A method as set forth in claim 11, wherein the compressed video segment includes a bit difference map indicating the locations of changed elementary units.

13. A method as set forth in claim 4, and further comprising:

identifying an index value retrieved from the compressed video segment as one of a plurality of escape codes, wherein one set of escape code values indicate runs of unchanged elementary units and another set of escape code values indicate runs of homogeneous elementary units.

14. A data processing system for decompressing a compressed video segment including a sequence of frames with selected scaling of frame resolution and color depth for playback on a playback platform, the data processing system comprising:

a display buffer;

means for supplying a compressed video segment including video information blocks associated with non-overlapping areas of a frame;

means for generating an output resolution scale for the frame;

means for retrieving the frame by elementary units;

means for determining a display type for each retrieved elementary unit, the display types including an unchanged type, a homogeneous type and a pattern type;

means responsive to retrieval of an elementary unit of the unchanged type for moving an output pointer to a display buffer by an elementary unit scaled by the output resolution scale;

means responsive to retrieval of an elementary unit of the homogeneous type for applying a color retrieved from the compressed video stream to an area in a frame stored in the display buffer scaled by the output resolution scale; and means responsive to retrieval of an elementary unit of the pattern type for retrieving a pattern from the compressed video stream and for applying the pattern to an area in the display buffer scaled by the output resolution scale.

15. A data processing system as set forth in claim 14, and further comprising:

a predetermined pattern type display type; and means responsive to retrieval of an elementary unit of the predetermined pattern type for retrieving a pattern from a table of patterns using an index retrieved from the compressed video segment and for applying the pattern to an area in the display buffer scaled by the output resolution scale.

16. A data processing system as set forth in claim 15, wherein a predetermined pattern and a pattern are each mapped by a binary bit map, and further comprising:

means responsive to retrieval of an elementary unit of the pattern type, or the predetermined pattern type, for applying first and second colors retrieved from the compressed video segment to the off and on values, respectively, of the binary bit map; and means for setting a color depth for colors upon retrieval from the compressed video segment.

17. A data processing system as set forth in claim 16, wherein the means for determining a display type for each retrieved elementary unit comprises:

means for retrieving from the compressed video segment an elementary unit group block header wherein the block header is divided into a sequence of segments, each segment corresponding to an elementary unit for the frame and each segment having a value corresponding to a display type.

18. A data processing system as set forth in claim 17, and further comprising:

means for determining an ordering for display of the elementary units of an elementary unit group from the sequence of the segments in a block header.

19. A data processing system as set forth in claim 18, wherein the ordering is in the direction of rows of a frame.

20. A data processing system as set forth in claim 18, wherein the ordering is for quadrants of a rectangular group of elementary units.

21. A data processing system as set forth in claim 20, wherein the display types for an elementary unit further include a subsampled type, and further comprising:

means responsive to determination that an elementary unit is of the subsampled type for recovering four colors for the elementary unit and applying one each of the colors to each of four quadrants of the elementary unit.

22. A data processing system as set forth in claim 21, and further comprising:

means responsive to detection of codes for both the pattern or predetermined pattern type and the subsampled type in a block header for applying subsequent video information retrieved from the compressed video segment to group of elementary units covered in a block header as a group.

23. A data processing system as set forth in claim 14, wherein the means for determining a display type comprises an optimized routine for each possible value which can be assumed by the elementary unit group block header.

24. A data processing system as set forth in claim 16, wherein the means for determining a display type for each retrieved elementary unit includes:

means for retrieving a first color information block for an elementary unit from the compressed video segment;

means for determining from a least significant bit for a color or luminance value in the first color information block whether the elementary unit is of the homogeneous type;

means responsive to determination that the elementary unit is not of the homogeneous type for retrieving a second color information block for the elementary unit; and means for determining from a least significant bit for a color or luminance value in the second color information block whether the elementary unit is the pattern or predetermined pattern type.

25. A data processing system as set forth in claim 24, and further comprising:
   means responsive to determination that an elementary unit is of the predetermined pattern type for retrieving a pattern using an index recovered from the compressed video segment into a table of patterns;
   means responsive to determination that an elementary unit is of the pattern type for retrieving a pattern from the compressed video segment; and
   means for applying colors defined by the first and second color information blocks to the pattern.

26. A data processing system as set forth in claim 25, wherein the compressed video segment includes a bit difference map indicating the locations of changed elementary units.

27. A data processing system as set forth in claim 17, and further comprising:
   means for identifying an index value retrieved from the compressed video segment as one of a plurality of escape codes, wherein one set of escape code values indicate runs of unchanged elementary units and another set of escape code values indicate runs of homogeneous elementary units.

28. A compressed video segment frame for supporting decompression on a plurality of platforms with differing calculating capacities by providing selectable scaling of output color and spatial resolution, the compressed video segment frame comprising:
   a compressed frame;
   a frame header containing the number of calculations required to decompress the compressed frame at each of a plurality of output color and spatial resolutions;
   a plurality of block headers identifying block of elementary regions of the compressed frame and position of the elementary regions within the compressed frame;
   sections of the block headers identifying by use of selected values, the elementary regions as to one of a plurality of types of elementary region, including unchanged, pattern, and homogeneous; and
   color blocks for pattern, predetermined pattern and homogeneous type elementary units.

29. A compressed video segment frame for supporting decompression with selectable scaling of output color and spatial resolution as set forth in claim 28, wherein certain combinations of the selected values for the sections of the block headers identify a group of elementary regions for as to one of a plurality of types as a whole.

30. A compressed video segment frame for supporting decompression with selectable scaling of output color and spatial resolution as set forth in claim 28, and further comprising:
   a selected value for sections of the block headers identifying an elementary unit as being of a predetermined pattern, the compressed video segment; and
   an index block into a table of patterns.

31. A compressed video segment frame for decompression on a plurality of platforms with differing calculating capacities by providing selectable scaling of output color and spatial resolution, the compressed video segment frame comprising:
   a compressed frame;
   a frame header containing the number of calculations required to decompress the compressed frame at each of a plurality of output color and spatial resolutions;
   at least a first color block for each of a plurality of elementary regions of the compressed frame;
   a selected bit location in the first color block for designating an elementary region as homogeneous;
   a second color block for some of the plurality of elementary regions of the compressed frame; and
   a selected bit location in the second color block for designating an elementary region as a pattern or, in combination with the selected bit location in the first color block, as being of another type.

32. A compressed video segment frame for supporting decompression with selectable scaling of output color and spatial resolution as set forth in claim 31, and further comprising:
   a bit difference map following the frame header indicating the locations of changed elementary regions in the compressed frame.

* * * * *

UNITED STATES PATENT AND TRADEMARK OFFICE
CERTIFICATE OF CORRECTION

PATENT NO. : 5,300,949

DATED : Apr. 5, 1994

INVENTOR(S) : Arturo A. Rodriguez, Mark A. Pietras, Steven M. Hancock, Robert F. Kantner, Jr., Charles T. Rutherfoord, Leslie R. Wilson It is certified that error appears in the above-identified patent and that said Letters Patent is hereby corrected as shown below:

ON THE TITLE PAGE OF PATENT

Immediately below "United States Patent"    delete "Rodriquez et al." and substitute therefore -- Rodriguez et al. -- ;

after "Inventors"    delete "Arturo A. Rodriquez," and substitute therefore -- Arturo A. Rodriguez, -- .

Signed and Sealed this

Thirteenth Day of September, 1994

Attest:

BRUCE LEHMAN

*Attesting Officer*    *Commissioner of Patents and Trademarks*